United States Patent
Hermansson et al.

(10) Patent No.: US 8,020,373 B2
(45) Date of Patent: Sep. 20, 2011

(54) ENGINE SYSTEM AND METHOD FOR PURGE GAS REGENERATION OF AN EXHAUST GAS TREATMENT DEVICE IN SUCH A SYSTEM

(75) Inventors: Jonas Hermansson, Lindome (SE); Niklas Vollmer, Åsa (SE); Anders Holger Johnsson, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 915 days.

(21) Appl. No.: 11/959,826

(22) Filed: Dec. 19, 2007

(65) Prior Publication Data

US 2008/0148718 A1 Jun. 26, 2008

(30) Foreign Application Priority Data

Dec. 22, 2006 (EP) .................................... 06127167

(51) Int. Cl.
*F01N 5/00* (2006.01)
*F01N 3/00* (2006.01)
(52) U.S. Cl. .................. 60/286; 60/281; 60/290
(58) Field of Classification Search ............... 60/286
See application file for complete search history.

(56) References Cited

U.S. PATENT DOCUMENTS

| | | | | |
|---|---|---|---|---|
| 6,003,498 A * | 12/1999 | Reddy | ........................... | 123/520 |
| 6,161,377 A | 12/2000 | Boegner et al. | | |
| 6,363,908 B1 * | 4/2002 | Kerns | ........................... | 123/295 |
| 6,497,095 B2 * | 12/2002 | Carberry et al. | ................ | 60/295 |
| 6,505,599 B1 * | 1/2003 | Mashiki et al. | ................ | 123/295 |
| 6,651,640 B1 * | 11/2003 | Sealy et al. | ..................... | 123/698 |
| 6,735,941 B2 * | 5/2004 | Saito et al. | ....................... | 60/295 |
| 6,778,898 B1 * | 8/2004 | Bidner et al. | ................. | 701/109 |
| 6,857,264 B2 * | 2/2005 | Ament | ........................... | 60/284 |
| 6,901,749 B2 | 6/2005 | Hashimoto | | |
| 7,229,597 B2 * | 6/2007 | Patchett et al. | ............... | 422/177 |
| 2003/0224907 A1 * | 12/2003 | Surnilla | ........................ | 477/182 |
| 2003/1224907 | 12/2003 | Surnilla | | |
| 2006/0196165 A1 * | 9/2006 | Otsubo et al. | ................... | 60/274 |

FOREIGN PATENT DOCUMENTS

| | | |
|---|---|---|
| DE | 10122061 | 11/2001 |
| EP | 0931923 | 7/1999 |
| EP | 0869267 | 9/2003 |
| GB | 2362842 A * | 12/2001 |

* cited by examiner

*Primary Examiner* — Thomas Denion
*Assistant Examiner* — Jason Shanske
(74) *Attorney, Agent, or Firm* — Brooks Kushman P.C.

(57) ABSTRACT

A method and a system for regenerating an exhaust gas treatment device for an internal combustion engine having at least one cylinder are presented. The system comprises an exhaust gas treatment device, a fuel storage means, a fuel vapor retainer, and an engine control unit adapted to selectively allow fuel vapors from the fuel vapor retainer to reach the engine. The method comprises regenerating an exhaust gas treatment by allowing fuel vapors from the fuel vapor retainer into at least one of the engine cylinders, and inhibiting combustion in at least one of the cylinders into which fuel vapors are to be allowed.

22 Claims, 3 Drawing Sheets

ENGINE SYSTEM AND METHOD FOR PURGE GAS REGENERATION OF AN EXHAUST GAS TREATMENT DEVICE IN SUCH A SYSTEM

TECHNICAL FIELD

The present invention relates to a method for regenerating an exhaust gas treatment device in an internal combustion engine with at least one cylinder, the engine coupled to a fuel storage device, and a fuel vapor retainer, and more particularly to selectively injecting fuel vapors from a fuel vapor retainer into one or more engine cylinders and disabling combustion in those cylinders in order to regenerate the exhaust gas treatment device.

BACKGROUND

Modern vehicles are equipped with exhaust gas treatment devices, known as catalytic converters, that convert regulated substances such as hydrocarbons (HC), carbon monoxide (CO) and nitrogen oxides (NOx) into substances such as carbon dioxide (CO2), nitrogen (N2) and water (H2O). A known problem with catalytic converters is that certain substances can remain, for example by physical or chemical adsorption, on internal surfaces of the converters, and reduce the capacity of the converters. Such detrimental adsorption is known as catalytic converter poisoning. For example, fuels, whether gasoline or diesel, for vehicle internal combustion engines, contain a relatively high amount of sulfur, typically depending on in which state or region they are provided. The sulfur creates problems for the operation of the catalyst exhaust gas treatment devices. In the engine combustion process, the sulfur is converted to sulfur oxides (SOx), which adsorbs strongly to internal surfaces of the catalyst and therefore reduces its exhaust gas treatment capacity. This process is often referred to as sulfur poisoning. Sulfur adsorption is particularly strong during low load driving conditions.

A number of catalytic converter regeneration measures to solve this problem have been suggested. It is well known that the catalytic converter can be restored from sulfur poisoning by being exposed to high temperatures.

Patent publication U.S. Pat. No. 6,161,377 suggests heating the catalytic converter by introducing secondary air into the exhaust gases, combined with providing a rich mixture to the cylinders. A disadvantage with this method is that it requires an additional component in the form of an air pump for the introduction of the secondary air. Apart from adding to the complexity and the cost of the engine system, such an air pump creates a noise, which can be disturbing to drivers and passengers in a vehicle in which the pump is installed. Further, a high exhaust gas pressure can give an excessive load to the air pump. Also, since air, according to said patent publication, is injected downstream of the engine, relatively close to the catalytic converter, there is a possibility that the fuel and air will not be fully mixed when reaching the catalytic converter. This reduces the efficiency of the regeneration method, and can cause concentration of fuel, which may result in damage of the catalytic converter.

Patent publication U.S. Pat. No. 6,901,749 discloses, in order to heat the catalytic converter, providing a rich mixture to the engine cylinders combined with adjusting the ignition timing so as to provide a relatively late ignition during the engine cycles. The idea is to allow combustion to continue in the exhaust conduit downstream of the engine cylinders in order to heat the catalytic converter. However, this measure has the disadvantage that it causes vibration and affects the drivability negatively in a vehicle, in which it is carried out. In addition, it increases the fuel consumption, and reduces the available torque of the engine. Also, since the energy for heating the catalytic converter is transported thermally, there are substantial energy losses between the engine and the catalytic converter in the form of temperature decrease. In the case of the catalytic converter being provided relatively far from the engine, the energy losses may be such that no, or an insufficient result is provided by the measure. Also, in the case of the engine system being equipped with an exhaust turbo charger, the energy losses at the delayed ignition regeneration measure are further increased.

SUMMARY OF THE INVENTION

This invention is directed to an efficient method and system for regenerating an exhaust gas treatment device for an internal combustion engine.

Accordingly, a method and a system for regenerating an exhaust gas treatment device include allowing purge gas from the fuel vapor retainer into at least one of the engine cylinders, and inhibiting combustion in at least one of the cylinders into which purge gas is allowed.

By using purge gas from a fuel vapor retainer, air and fuel can be introduced into the inlet manifold mixed, and be thoroughly mixed with air in the cylinder(s), and be further mixed between the cylinder(s) and the catalytic converter. This provides a homogenous distribution of fuel and air across the lateral extensions of the catalytic converter, in which the mixture is combusted so as to heat the exhaust gas treatment device. The result is a very effective regeneration, and minimizing risks of the regeneration measure causing damage to the catalytic converter. This thorough regeneration is provided simply by use of purge gas from a fuel vapor retainer, without the need for additional equipment in the engine system.

Also, the regeneration method may be carried out without causing disturbance to drivers and passengers in a vehicle with the engine system. In addition, use of the invention does not lead to any vibration in a vehicle, in which it is carried out. More generally, use of the invention does not lead to any deterioration in the noise, vibration and harshness (NVH) performance of the vehicle. Further, due to the chemical transportation of energy for regeneration, there is no significant increase in the fuel consumption, and the available torque of the engine is not affected. Also, since the energy for heating the catalytic converter is transported chemically, i.e., in the air/fuel mixture, and converted to thermal energy in the catalytic converter, there are essentially no energy losses between the engine and the catalytic converter. Thus, the invention provides a very effective regeneration measure, even in a case where the catalytic converter is provided relatively far from the engine, and/or in the case of the engine system being equipped with an exhaust turbocharger.

The use of purge gas for heating exhaust gas treatment device makes the method advantageous for low load conditions, at which the exhaust gas treatment device temperature is relatively low, the normal fuel supply is relatively low, and sulfur adsorption in particularly strong.

Preferably, where the engine is coupled to a fuel injection system, the exhaust gas treatment device regeneration is performed if the existence of at least one condition indicative of a fuel injection inhibition is determined. Thereby, the regeneration is performed during a fuel cut mode of the engine, for example caused by an accelerator pedal being released by a driver of a vehicle in which the method is used. This makes it possible to provide a timing of the regeneration, at which it does not in any way interfere with other aspects of the engine operation. In a vehicle, performing exhaust gas treatment device regeneration in situations in which there is normally a fuel cut provides a simple and effective regeneration, that may be carried out without causing disturbance to drivers and passengers, and that does not compromise output torque requirements during the vehicle operation.

It should be noted that the existence of the at least one condition indicative of a fuel injection inhibition can be determined in a variety of manners. For example, the condition can correspond to a fuel injection control parameter corresponding to no fuel injection, an accelerator pedal setting signal corresponding to a released accelerator pedal, or a requested torque parameter value corresponding to zero (or negative) requested torque. In general, any parameter related to the fuel injection control can be used to determine the condition indicative of a fuel injection inhibition. Also, the condition can be determined before a fuel cut period has commenced, for example where a released accelerator pedal signal is used as the condition, or after a fuel cut period has commenced, and for example where a fuel injection control parameter corresponding to no fuel injection is used as the condition indicative of a fuel injection inhibition.

For example, if the requested torque in a vehicle is at or below a threshold value, usually a fuel cut mode, in which the fuel injection is inhibited, follows. Thus, according to one embodiment, the step of determining the existence of at least one condition indicative of a fuel injection inhibition, comprises determining a value of a control parameter corresponding to, or being related to a requested torque of the engine, and comparing the determined control parameter value with a control parameter threshold value, the determination of the existence of at least one condition indicative of a fuel injection inhibition being dependent on the comparison between the determined control parameter value and the control parameter threshold value. Preferably, it is determined that the fuel injection means are not controlled so as to inhibit fuel injection if the requested torque is above the requested torque threshold value. Usually, a zero or a negative requested torque, for example caused by an accelerator pedal being released by a driver of a vehicle in which the method is used, is followed by a fuel cut mode in which the fuel injection is inhibited. Thus, in one embodiment, the requested torque threshold value is zero.

Preferably, the method includes estimating the contents of fuel in the fuel vapor retainer and determining, based on the estimation of the contents of fuel in the fuel vapor retainer, whether to perform the purge gas exhaust gas treatment device regeneration. Thereby, it can be established whether there is enough fuel in the fuel vapor retainer for carrying out an efficient regeneration of the exhaust gas treatment device.

Preferably, the method further includes determining during the exhaust gas treatment device regeneration the temperature of the exhaust gas treatment device, and terminating the purge gas exhaust gas treatment device regeneration if it is determined that the temperature of the exhaust gas treatment device is above a predetermined temperature limit value. Thereby, temperatures that are high enough to cause a risk of damaging the catalytic converter can be effectively avoided. It should be noted that avoiding too high catalytic converter temperatures is of outmost importance to prevent premature catalytic converter ageing.

Preferably, the method also includes determining during the exhaust gas treatment device regeneration a value of a control parameter corresponding to, or being related to a requested torque of the engine, the exhaust gas treatment device regeneration being dependent on the control parameter value determination. Thereby, the exhaust gas treatment device regeneration can be adjusted, for example as described below, to allow the engine to deliver the torque requested. In one embodiment, it is determined whether the control parameter value is above a predetermined threshold value, and the exhaust gas treatment device regeneration is terminated if it is determined that the control parameter value is above the predetermined threshold value. This makes it possible to quickly respond to torque requests based on accelerator pedal maneuverings.

Preferably, the method further includes controlling air flow so as to control the combustion in the exhaust gas treatment device during the exhaust gas treatment device regeneration. By adjusting the air flow, for example based on the purge gas flow and/or the hydrocarbon content of the purge gas, it can be secured that a combustible air/fuel mixture is provided to the catalytic converter during the regeneration action. Also, controlling the combustion in the exhaust gas treatment device could include controlling a location or a region of a maximum temperature in the exhaust gas treatment device. Thereby, as explained closer below, the air flow control can be used to control the temperature distribution in a longitudinal direction of the catalytic converter. By changing, during the sulfur regeneration, the location of the maximum temperature, it is possible to obtain a particularly thorough regeneration, since it can be secured that the temperature is increased sufficiently for sulfur deposit removal throughout the entire catalytic converter. Also, moving the maximum temperature in this way further reduces the risk of damaging the catalytic converter by high temperature exposure. Specially, the risk of excessive temperatures in an upstream end of the catalytic converter can be substantially reduced, so that catalytic converter damage can be effectively avoided.

BRIEF DESCRIPTION OF THE FIGURES

Below, the invention will be described in detail with reference to the drawings, in which.

DETAILED DESCRIPTION OF PREFERRED EMBODIMENT(S)

Figure 1:
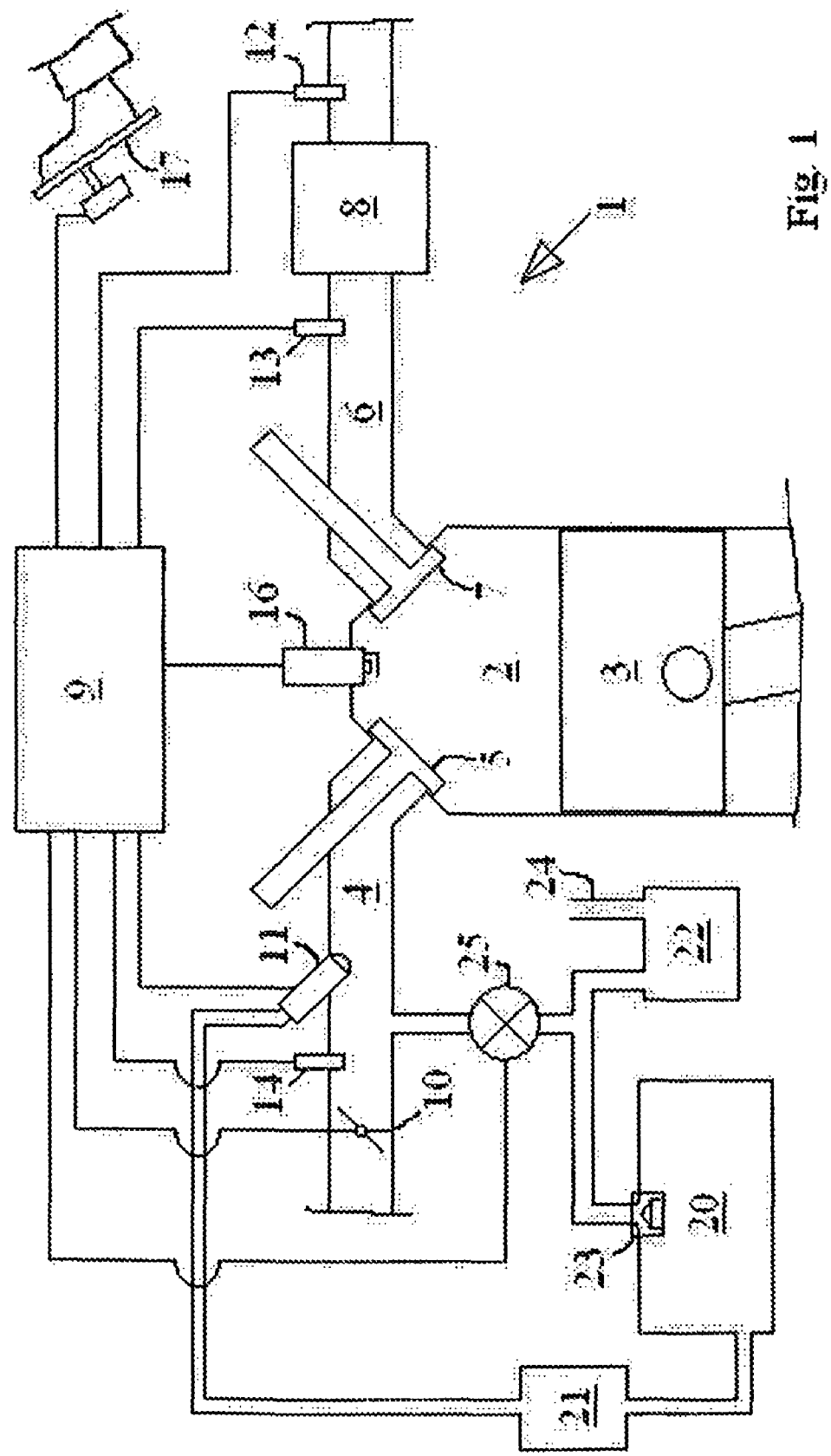
FIG. 1 shows a schematic view of parts of a vehicle engine system.

FIG. 1 shows a schematic view of parts of a vehicle engine system 1 including an internal combustion engine. The engine has at least one cylinder 2 with a reciprocating piston 3. Communication between the cylinder 2 and an inlet duct 4 is controlled by at least one inlet valve 5, and communication between the cylinder 2 and an exhaust duct 6 is controlled by at least one exhaust valve 7. Downstream from the cylinder(s) 2, an exhaust gas treatment device 8, in the form of a catalytic converter, is provided.

The engine system 1 also includes an engine control unit (ECU) 9, which can be provided as one unit, or as more than one logically interconnected physical units. The ECU 9 is adapted to control a throttle valve 10, and fuel injection system 11 including at least one fuel injector 11 in the inlet duct 4. In this embodiment, where the engine presents more than one cylinder, the fuel injection can be controlled individually for each cylinder, by a fuel injector being provided at a separate portion of the inlet duct 4 communicating with the respective cylinder, (so called port fuel injection). Alternatively, as is known in the art, a fuel injector can be provided in each cylinder 2, (so called direct fuel injection). As a further alternative, one single fuel injector can be provided for more than one cylinder, or all cylinders, for example at an upstream portion of the inlet duct communicating with more than one cylinder, or all cylinders.

The ECU 9 is also adapted to receive signals from a first gas sensor 12 located downstream of the catalytic converter 8, as well as from a second gas sensor 13 located in the exhaust duct 6 between the cylinder 2 and the catalytic converter 8. The ECU 9 is adapted to determine, based on the signals from the first and second sensors 12, 13, the oxygen content in the exhaust gases upstream and downstream, respectively, of the catalytic converter 8. As is known in the art, the oxygen content in the exhaust gases is indicative of the lambda value of the air/fuel mixture provided to the engine.

In addition, the ECU 9 is also adapted to determine the engine air flow based on signals received from an air flow sensor 14 located in the inlet duct 4. As an alternative, as is known in the art, the air flow can be computed based on parameters such as the inlet manifold pressure, throttle position, engine speed, inlet temperature, and atmospheric pressure. Manners of determining the values of these parameters are known in the art, and not explained further here.

The ECU 9 is adapted to determine the temperature of the catalytic converter 8 based at least partly on the air flow, the lambda value, the ambient temperature, engine load, and engine rotational speed. As an alternative, the ECU 9 can be adapted to receive signals from a temperature sensor located in the exhaust duct 6 between the cylinder 2 and the catalytic converter 8, based on which signals, the catalytic converter temperature can be determined.

Further, at each cylinder, a spark plug 16 is provided and is controllable by the ECU 9. Also, the ECU is adapted to adjust, as known in the art, the value of a requested torque parameter based on signals from an accelerator pedal 17 in the vehicle.

The ECU 9 is adapted to determine, based at least partly on an analysis of a signal from the first gas sensor 12, the level of sulfur poisoning of the catalytic converter 8, and whether the catalytic converter 8 is subjected to sulfur poisoning, as described in the European patent application entitled "An internal combustion engine system and a method for determining a condition of an exhaust gas treatment device in a such a system", filed by the applicant on the first filing date of the present application, and incorporated herein by reference.

Alternatively, the ECU 9 can be adapted to determine the level of sulfur poisoning of the catalytic converter, and whether the catalytic converter 8 is subjected to sulfur poisoning, by some alternative method. For example, a sulfur poisoning establishment procedure can include adjusting in the ECU 9 a sulfur oxide (SOx) adsorption counter, based on air-fuel ratio, engine operating condition, catalyst temperature, the engine rotational speed and the intake pressure.

The fuel injector 11 communicates with the fuel tank 20, via a fuel pump 21. The engine system is also provided with a fuel vapor retainer in the form of a canister 22, (which could enclose carbon for retaining vaporized fuel as known in the art), which can communicate with the fuel tank 20 via a vapor vent valve 23. Further, the canister 22 is provided with a canister air inlet 24. The canister 22 and the fuel tank 20 can communicate with the inlet duct 4 via a purge gas supply valve 25, which is controllable by the ECU 9.

Figure 2:
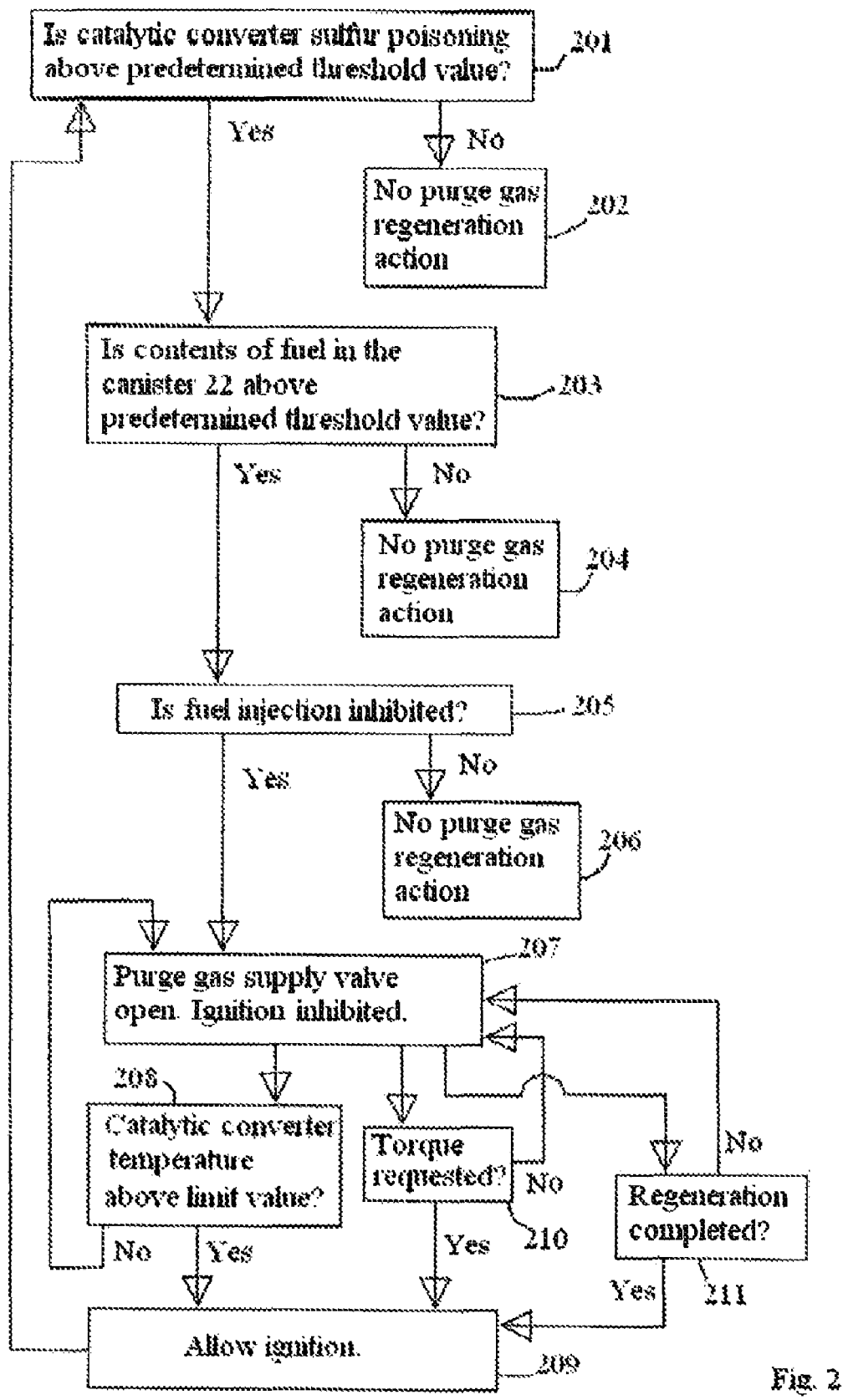
FIG. 2 shows a block diagram depicting an exemplary method according to a preferred embodiment of the invention.

FIG. 2 depicts an exemplary method according to a preferred embodiment of the invention. The ECU 9 determines in 201 whether data corresponding to the level of sulfur poisoning of the catalytic converter is above a predetermined sulfur poisoning threshold value. If it is determined that the data corresponding to the level of sulfur poisoning is not above the sulfur poisoning threshold value, it is determined in 202 that no regeneration action is carried out.

If it is determined that the data corresponding to the level of sulfur poisoning is to above the sulfur poisoning threshold value, it is determined in 203 whether the contents of fuel in the canister 22 is above a predetermined canister level threshold value. The contents of the canister can be determined as is known in the art, for example based on measured values of lambda, injected fuel and air flow.

If it is determined that the contents of fuel in the canister 22 is below the threshold value, it is determined in 204 that no regeneration action is carried out. Alternatively, if it is determined that the canister level is low, a regeneration action, a described below, can be carried out while fuel is also allowed via the fuel injector.

If it is determined that the contents of fuel in the canister 22 is above the threshold value, it is determined in 205 whether the fuel injector 11 is controlled so as to inhibit fuel injection. If it is determined that the fuel injector 11 is not controlled so as to inhibit fuel injection, it is determined in 206 that no regeneration action is carried out.

If it is determined that the fuel injector 11 is controlled so as to inhibit fuel injection, a regeneration action, herein also referred to as an exhaust gas treatment device regeneration, is carried out in 207, comprising inhibiting ignition and controlling the purge gas supply valve 25 so that fuel from the canister 22 is allowed into the inlet duct 4 so as to mix with air. The air and fuel is transported through the cylinder(s) 2 and the exhaust duct 6. During this relatively long transportation, the air and fuel is allowed to mix well to provide a substantially homogenous mixture. The mixture reaches the catalytic converter 8 where it is combusted to increase the temperature of the converter 8 in order to eliminate sulfur deposits.

During the regeneration action, the temperature of the catalytic converter 8 is monitored by the ECU 9, in a manner mentioned above. If the catalytic converter temperature rises above a predetermined temperature limit value in 208, the regeneration action is terminated in 209 by allowing ignition. Thereby, the purge gas supply valve 25 can be closed or left open.

During the regeneration action, the setting of the accelerator pedal 17 is monitored by the ECU 9. If it is determined in 210 that the requested torque, for example due to maneuvering of the accelerator pedal, is above a predetermined threshold value, the regeneration action is terminated in 209 by allowing ignition. According to one embodiment, the predetermined threshold value of the requested torque is zero.

In the case of the engine having more than one cylinder and the fuel injection can be controlled individually for each cylinder, alternatively, based on the determined value of the requested torque, the purge gas supply valve 25 can be kept open, and ignition allowed and fuel supplied in only one or some of the cylinders. Thereby, the regeneration action can continue while at the same time the requested torque is provided. The amount of cylinders in which ignition and fuel injection is activated can be dependent in the value of the requested torque.

As mentioned, the ECU 9 is adapted to determine the level of sulfur poisoning of the catalytic converter. Thereby, the ECU 9 can be adapted to terminate a regeneration action when the level of sulfur poisoning has been reduced to a predetermined level. Thus, referring to FIG. 2, during the purge gas sulfur regeneration action, the level of sulfur poisoning of the catalytic converter is determined 211. If it is determined that the level of sulfur poisoning has been reduced to the predetermined level, the purge gas sulfur regeneration action is terminated 209 by allowing ignition by the ignition means 16.

Also, if the sulfur regeneration action is terminated in 209, for example due to the catalytic converter temperature rising above the predetermined temperature limit value, or due to a torque above a predetermined limit value being requested, the level of sulfur poisoning at the interruption of the regeneration action can be established. Thereby, the regeneration action can be "continued" in a suitable manner, once circumstances, as described above, allow such a "continuation" to take place.

In the method described above, fuel injection is closed during the regeneration. Alternatively, fuel injection can be allowed during the regeneration. Thereby, the supply of purge gas can be supplemented with injected fuel if needed to provide a suitable mixture for the regeneration.

Figure 3:
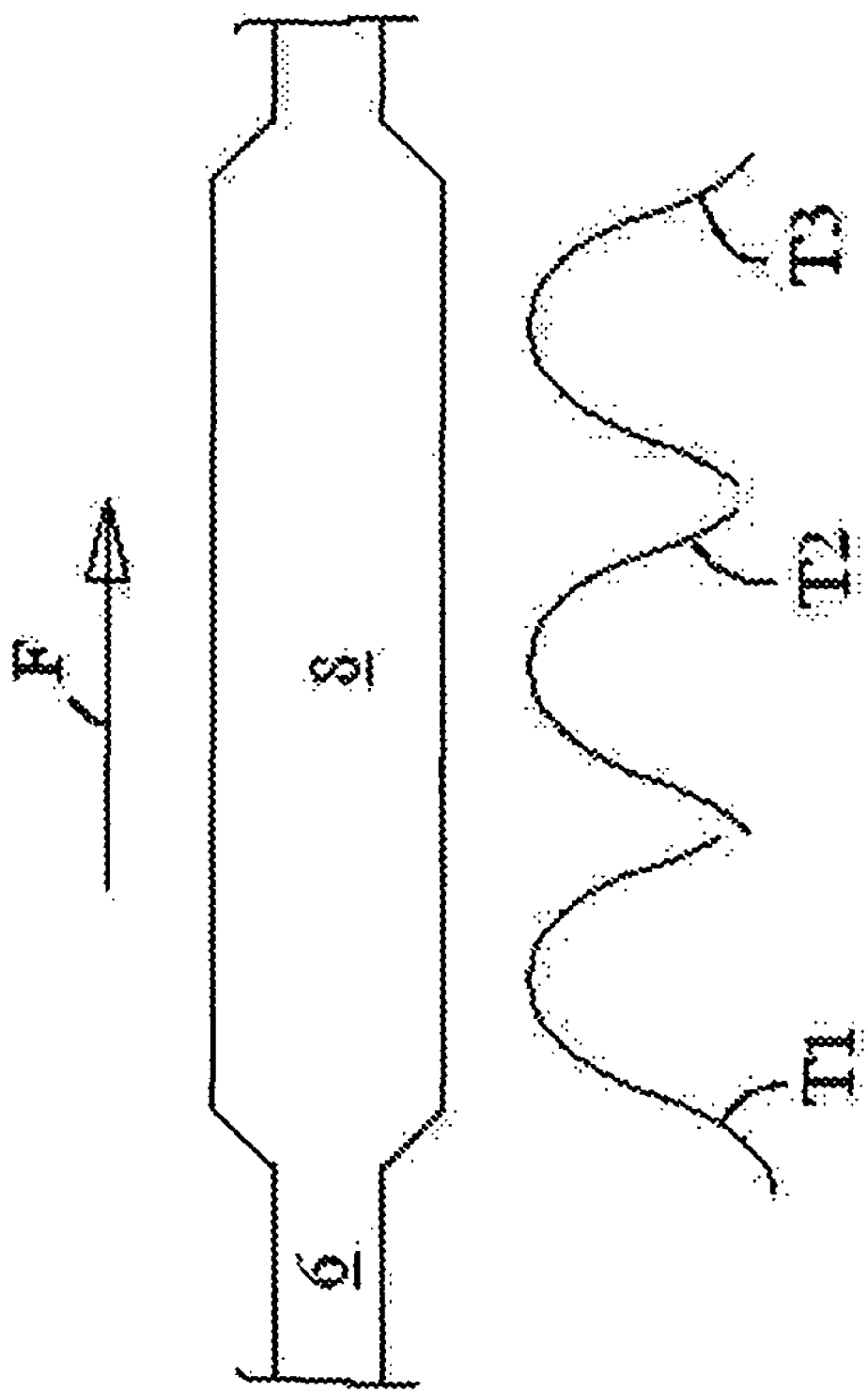
FIG. 3 is a schematic side view of a detail in FIG. 1 with temperature distribution curves.

Reference is made to FIGS. 1 and 3. The method includes controlling the throttle valve 10 so as to control the combustion in the catalytic converter 8 during the purge gas exhaust gas treatment device regeneration. The ECU 9 is adapted to determine, in a similar manner to the said determination of the contents of fuel in the canister 22, the hydrocarbon content of the purge gas. Based on the hydrocarbon content of the purge gas, the throttle is controlled so that a combustible air/fuel mixture is provided to the catalytic converter.

Referring to FIG. 3, in which a gas flow direction is indicated with an arrow F, the throttle valve 10 is also used during the regeneration to control the location of a maximum temperature in the exhaust gas treatment device. By controlling the throttle valve 10 so that a relatively small air flow is provided, the air/fuel mixture will be combusted relatively far upstream in the catalytic converter 8. As a result, the temperature distribution in the catalytic converter, indicated in FIG. 3 with the curve T1, will present a maximum relatively far upstream. By controlling the throttle valve 10 so that larger air flows are provided, the air/fuel mixture will be combusted further downstream in the catalytic converter 8. As a result, the temperature distribution in the catalytic converter, T2, T3, will present maximums further downstream, depending on the air flow. In other words, increasing the air flow will move the maximum temperature downstream.

Thus, the location of the maximum temperature can be changed, during the sulfur regeneration, which in turn makes it possible to obtain a particularly thorough regeneration, since it can be secured that the temperature is increased sufficiently for sulfur deposit removal throughout the entire catalytic converter.

As an alternative to, or in addition to a throttle valve 10, the air flow control means can comprise control means (not shown) for the inlet valve(s) 5 and/or the exhaust valve(s) 7, for example in the form of a variable valve timing (VVT) system and/or a cam profile shifting (CPS) system. Such inlet and/or exhaust valve control means can be used as an alternative or in addition to the throttle valve 10 for controlling the combustion in the catalytic converter 8 during the purge gas exhaust gas treatment device regeneration.

Besides exhaust gas treatment device poisoning caused by sulfur, the invention is equally applicable to poisoning caused by other substances, such as phosphorus. In particular, the invention results in the catalyst average temperature being kept higher, and as a result, long term phosphorus poisoning can be reduced.

The invention claimed is:

1. A method for an exhaust gas treatment device in an engine system comprising an internal combustion engine with at least one cylinder, the engine system further comprising fuel storage means and a fuel vapor retainer, the method comprising:
performing a purge gas exhaust gas treatment device regeneration, the purge gas exhaust gas treatment device regeneration directing purge gas from the fuel vapor retainer into at least one of the cylinders and inhibiting combustion in at least one of the cylinders into which purge gas is allowed; and
wherein the purge gas exhaust gas treatment device regeneration is performed if the existence of at least one condition indicative of a fuel injection inhibition is determined such that the purge gas exhaust gas treatment device regeneration is performed during a fuel cut mode of the engine.

2. The method according to claim 1, wherein the step of inhibiting combustion comprises controlling ignition means at the cylinder so that combustion is inhibited.

3. The method according to claim 1, wherein the engine comprises purge gas means, the fuel injection exhaust gas treatment device regeneration being performed if the existence of at least one condition indicative of a fuel injection inhibition is determined.

4. The method according to claim 3, wherein the step of determining the existence of at least one condition indicative of a fuel injection inhibition, comprises determining a value of a control parameter corresponding to a requested torque of the engine, and comparing the determined control parameter value with a control parameter threshold value, the determination of the existence of at least one condition indicative of a fuel injection inhibition being dependent on the comparison between the determined control parameter value and the control parameter threshold value.

5. The method according to claim 1, comprising estimating the contents of fuel in the fuel vapor retainer and determining, based on the estimation of the contents of fuel in the fuel vapor retainer, whether to perform the purge gas exhaust gas treatment device regeneration based on whether there is enough fuel in the fuel vapor retainer for carrying out an efficient regeneration of the exhaust gas treatment device.

6. The method according to claim 1, comprising determining during the purge gas exhaust gas treatment device regeneration the temperature of the exhaust gas treatment device, and terminating the purge gas exhaust gas treatment device regeneration if it is determined that the temperature of the exhaust gas treatment device is above a predetermined temperature limit value.

7. The method according to claim 1, comprising determining during the purge gas exhaust gas treatment device regeneration a value of a control parameter corresponding to, or being related to a requested torque of the engine, the purge gas exhaust gas treatment device regeneration being dependent on the control parameter value determination.

8. The method according to claim 7, comprising determining whether the control parameter value is above a predetermined threshold value, and terminating the purge gas exhaust gas treatment device regeneration if it is determined that the control parameter value is above the predetermined threshold value.

9. The method according to claim 1, comprising controlling air flow control means so as to control combustion in the exhaust gas treatment device during the purge gas exhaust gas treatment device regeneration.

10. The method according to claim 9, wherein controlling the combustion in the exhaust gas treatment device comprises controlling a location or a region of a maximum temperature in the exhaust gas treatment device.

11. The method according to claim 1, wherein allowing purge gas from the fuel vapor retainer into at least one of the cylinders comprises controlling valve means so as to allow purge gas from the fuel vapor retainer to reach the engine.

12. The method of according to claim 1, wherein the at least one condition indicative of the fuel injection inhibition condition includes at least one of an accelerator pedal setting signal corresponding to a released accelerator pedal and a requested torque parameter value corresponding to zero or negative requested torque.

13. For use with an internal combustion engine system having at least one cylinder, an exhaust gas treatment device, a fuel storage means, a fuel vapor retainer, a control valve means operable to selectively allow purge gas from the fuel vapor retainer to reach the engine, an engine control unit adapted to:
control a purge gas exhaust treatment device regeneration by controlling the valve means so as to allow purge gas from the fuel vapor retainer into at least one of the cylinders, and to inhibit, during the purge gas exhaust treatment device regeneration, combustion in and delivery of non-vaporized fuel to the at least one of the cylinders into which purge gas is allowed.

14. The engine system according to claim 13, wherein the engine comprises ignition means at each cylinder, the engine control unit being adapted to control the ignition means, during the purge gas exhaust treatment device regeneration, so that ignition is inhibited such that combustion is inhibited in the cylinder into which purge gas is allowed.

15. The engine system according to claim 14, wherein the engine comprises fuel injection means controllable by the engine control unit, the engine control unit being adapted to allow the purge gas exhaust gas treatment device regeneration if the existence of at least one condition indicative of a fuel injection inhibition is determined such that the purge gas exhaust gas treatment device regeneration is performed during a fuel cut mode of the engine.

16. The engine system according to claim 13, wherein the engine control unit is adapted to estimate the contents of fuel in the fuel vapor retainer and to determine, based on the estimation of the contents of fuel in the fuel vapor retainer, whether to perform the purge gas exhaust gas treatment device regeneration based on whether there is enough fuel in the fuel vapor retainer for carrying out an efficient regeneration of the exhaust gas treatment device.

17. The engine system according to claim 13, wherein the engine control unit is adapted to determine, during the purge gas exhaust gas treatment device regeneration, the temperature of the exhaust gas treatment device, and to terminate the purge gas exhaust gas treatment device regeneration if it is determined that the temperature of the exhaust gas treatment device is above a predetermined temperature limit value.

18. The engine system according to claim 13, wherein the engine control unit is adapted to determine, during the purge gas exhaust gas treatment device regeneration, a value of a control parameter corresponding to, or being related to a requested torque of the engine, and to control the purge gas exhaust gas treatment device regeneration in dependence on the control parameter value.

19. The engine system according to claim 18, wherein the engine control unit is adapted to determine whether the control parameter value is above a predetermined threshold value, and to terminate the purge gas exhaust gas treatment device regeneration if it is determined that the control parameter value is above the predetermined threshold value.

20. The engine system according to claim 13, wherein the engine comprises air flow control means controllable by the engine control unit, the engine control unit being adapted to control the air flow control means so as to control combustion in the exhaust gas treatment device during the purge gas exhaust gas treatment device regeneration.

21. The engine system according to claim 20, wherein the engine control unit is adapted to control the air flow control means so as to control a location or a region of a maximum temperature in the exhaust gas treatment device.

22. A method of facilitating regeneration of an exhaust gas treatment device without causing discomfort or disturbance to occupants within a vehicle and without compromising output torque requirements during vehicle operation, the vehicle having an internal combustion engine with at least one cylinder, a fuel injector for injecting fuel from a fuel tank into at least one cylinder, and a fuel vapor vent for injecting fuel vapor from a fuel vapor retainer into at least one cylinder, the method comprising:
instructing regeneration of the exhaust gas treatment device with purge gas regeneration by directing fuel vapor from the fuel vapor retainer into at least one of the cylinders during a fuel cut mode of the engine where zero output torque is requested from the engine; and
while directing fuel vapor from the fuel vapor retainer into the at least one of the cylinders, inhibiting the fuel injector from injecting fuel into the at least one cylinder and inhibiting combustion of the fuel vapor to facilitate regeneration of the exhaust gas treatment device without causing discomfort or disturbance to occupants within the vehicle and without compromising output torque requirements during vehicle operation.

* * * * *